(12) United States Patent
Griffin et al.

(10) Patent No.: US 10,324,708 B2
(45) Date of Patent: Jun. 18, 2019

(54) MANAGING UPDATES TO CONTAINER IMAGES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/812,026

(22) Filed: Nov. 14, 2017

(65) Prior Publication Data

US 2019/0146772 A1    May 16, 2019

(51) Int. Cl.
*G06F 8/65* (2018.01)
*G06F 8/71* (2018.01)
*G06F 11/36* (2006.01)

(52) U.S. Cl.
CPC .................. *G06F 8/65* (2013.01); *G06F 8/71* (2013.01); *G06F 11/3664* (2013.01); *G06F 11/3688* (2013.01)

(58) Field of Classification Search
USPC .................................. 717/120–135, 168–178
See application file for complete search history.

(56) References Cited

U.S. PATENT DOCUMENTS

| | | | |
|---|---|---|---|
| 6,536,037 B1 * | 3/2003 | Guheen .................... | G06F 8/71 703/2 |
| 7,181,731 B2 * | 2/2007 | Pace ........................ | G06F 8/60 717/136 |
| 8,544,016 B2 * | 9/2013 | Friedman ............. | G06F 11/3664 717/107 |
| 9,274,784 B2 | 3/2016 | Wang et al. | |
| 9,619,655 B2 | 4/2017 | Bach et al. | |
| 2003/0037173 A1 * | 2/2003 | Pace ........................ | G06F 8/60 719/310 |

(Continued)

FOREIGN PATENT DOCUMENTS

CN    105847045 A    8/2016

OTHER PUBLICATIONS

Reitblatt, Mark, et al. "Consistent updates for software-defined networks: Change you can believe in!." Proceedings of the 10th ACM Workshop on Hot Topics in Networks. ACM, 2011.pp. 1-6 (Year: 2011).*

(Continued)

*Primary Examiner* — Satish Rampuria
(74) *Attorney, Agent, or Firm* — Kilpatrick Townsend & Stockton LLP (57) ABSTRACT

Updates to container images can be managed. For example, a processing device can detect that a first container-image is updated by monitoring a repository associated with the first container-image. The first container-image can be updated subsequent to a second container-image being built. The processing device can determine that the second container-image depends on the first container-image by analyzing a database that indicates a dependency relationship between the second container-image and the first container-image. The processing device can then automatically rebuild the second container-image using an updated version of the first container-image in response to (i) detecting that the first container-image was updated, and (ii) determining that the second container-image depends on the first container-image.

20 Claims, 5 Drawing Sheets

(56) References Cited

U.S. PATENT DOCUMENTS

| | | | |
|---|---|---|---|
| 2011/0214112 A1* | 9/2011 | Vidal | G06F 8/65 |
| | | | 717/168 |
| 2016/0294605 A1* | 10/2016 | Searle | H04L 41/082 |
| 2017/0034023 A1 | 2/2017 | Nickolov et al. | |
| 2017/0116415 A1 | 4/2017 | Stopel et al. | |
| 2017/0177860 A1 | 6/2017 | Suarez et al. | |
| 2018/0321918 A1* | 11/2018 | Mcclory | H04L 63/0236 |

OTHER PUBLICATIONS

Liu, Ting, and Margaret Martonosi. "Impala: A middleware system for managing autonomic, parallel sensor systems." ACM Sigplan Notices. vol. 38. No. 10. ACM, 2003.pp. 107-118 (Year: 2003).*

Bellissimo, Anthony, John Burgess, and Kevin Fu. "Secure Software Updates: Disappointments and New Challenges." HotSec. 2006.pp. 37-43 (Year: 2006).*

Docker Announces the General Availability of Security Scanning to Safeguard Container Content Across the Software Supply Chain, May 10, 2016, https://www.docker.com/docker-news-and-press/docker-announces-general-availability-security-scanning-safeguard-container.

Five Best Practices for Improving Docker® Lifecycle Management, 2017, http://vyomlabs.com/wp-content/uploads/2017/06/cloud-management-Whitepaper.pdf.

* cited by examiner

| Subject | Severity | Product ID | RuleSet | Tracking Code | Layer | Due | Date Published | Images Impacted | Commit ID | Instance ID | Advisory |
|---|---|---|---|---|---|---|---|---|---|---|---|
| samba | A | RHMAP | core | RHMAP1467 | L_1 | 2017-10-14 | 2017-09-20 | fn-aaa, fn-appstore, fn-mbaas, fn-messaging, fn-metrics, fn-ngui, fn-scm, fn-statsd, fn-supercore, gitlab-shell, httpd, installer, nagios, wildcard-proxy | ID_1 | inst_ID_1 | URL_1 |
|  |  |  |  |  |  | 2017-10-14 | 2017-09-22 | fn-aaa, fn-appstore, fn-mbaas, fn-messaging, fn-metrics, fn-ngui, fn-scm, fn-statsd, fn-supercore, gitlab-shell, httpd, installer, nagios, wildcard-proxy |  |  |  |
| postgresql | A | RHEL | core | RHEL3345 | L_3 |  |  |  |  |  |  |
| mysql56 | C | RHMAP | core | RHMAP1300 | L_2 | 2017-12-20 | 2017-08-13 | fn-mbaas, fn-messaging | ID_2 | inst_ID_2 | URL_2 |
| nodejs6 | A | RHMAP | node_nsp | RHMAP1472 | L_1 | 2017-10-14 | 2017-09-20 | fn-mbaas, fn-supercore | ID_3 | inst_ID_3 | URL_3 |
| nodejs4 | B | RHEL | node_snyk | RHEL4821 | L_5 | 2017-11-15 | 2017-10-01 | nagios | ID_4 | inst_ID_3 | URL_4 |
| java8 | B | RHMAP | java_owasp | RHMAP1690 | L_2 | 2017-11-15 | 2017-09-29 | gitlab-shell | ID_5 | inst_ID_4 | URL_5 |
|  |  |  |  |  |  |  |  |  | ID_6 | inst_ID_5 | URL_6 |

MANAGING UPDATES TO CONTAINER IMAGES

TECHNICAL FIELD

The present disclosure relates generally to software development and management. More specifically, but not by way of limitation, this disclosure relates to managing updates to container images.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into isolated virtual environments called "containers." Containers can be launched from image files, which can be referred to as container images.

Container images can depend on other container images. For example, a container image for a web server can depend on another container image for a HyperText Transfer Protocol (HTTP) Daemon used by the web server. In some cases, one container image can be a dependency for dozens or hundreds of other container images.

Occasionally, problems with container images (e.g., software in the container image) are identified and communicated to developers of the container images. Examples of such problems can include bugs, exploits, unpatched program code, or any combination of these. The problems may be communicated to the developers in the form of a Common Vulnerability and Exposure (CVE) alert or another type of alert. The developers typically fix the problems and release an updated version of the container image, which can then be downloaded by consumers and used to launch an updated version of the container.

DETAILED DESCRIPTION

There can be disadvantages to having container images depend on other container images. For example, if a container image is updated (e.g., rebuilt) to fix flawed software, all of the other container images that depend on the container image must also be updated. As a particular example, the developers of container image A may receive an alert that software in the container image is flawed. So, the developers may patch the software and rebuild container image A using the updated version of the software. But then the developers (or other developers) must also manually rebuild all of the other containers that depend on container A, which may be dozens or hundreds of other container images. This can be a time consuming and difficult manual process that requires a large amount of development resources.

Some examples of the present disclosure overcome one or more of the abovementioned issues by automatically rebuilding container images if a dependency is updated. For example, a computing device can detect that container image A has been updated; determine that container images B, C, and D depend on container image A; and then automatically rebuild container images B, C, and D. This can significantly cut down on the time, difficulty, and developer resources required to update container images, and can help ensure that container images remain up-to-date.

There can also be disadvantages to immediately rebuilding container images each time a new alert comes in, regardless of the severity of the alert or the characteristics of the container image. This may, for example, result in unnecessary rebuilding that consumes valuable time, computer resources, and developer resources.

Some examples of the present disclosure also overcome one or more of the above-mentioned issues by using a customizable rule set that governs when a rebuild of a container image is to be triggered. The rule set can, for example, indicate that a rebuild of a specific container is only to be triggered for alerts having a certain severity-level or having certain pre-defined characteristics. This can cut down on unnecessary rebuilding of container images and thus wasted computational resources.

Some or all of the abovementioned features can be combined into a holistic container-management tool that can automatically (i) determine if a particular container-image is to be updated using a customizable rule set, (ii) detect when the particular container-image has been updated, and then (iii) update any other container images that depend on the particular container-image. The container-management tool may also automatically test the updated container image(s) in a test environment to identify any issues resulting from the updates.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
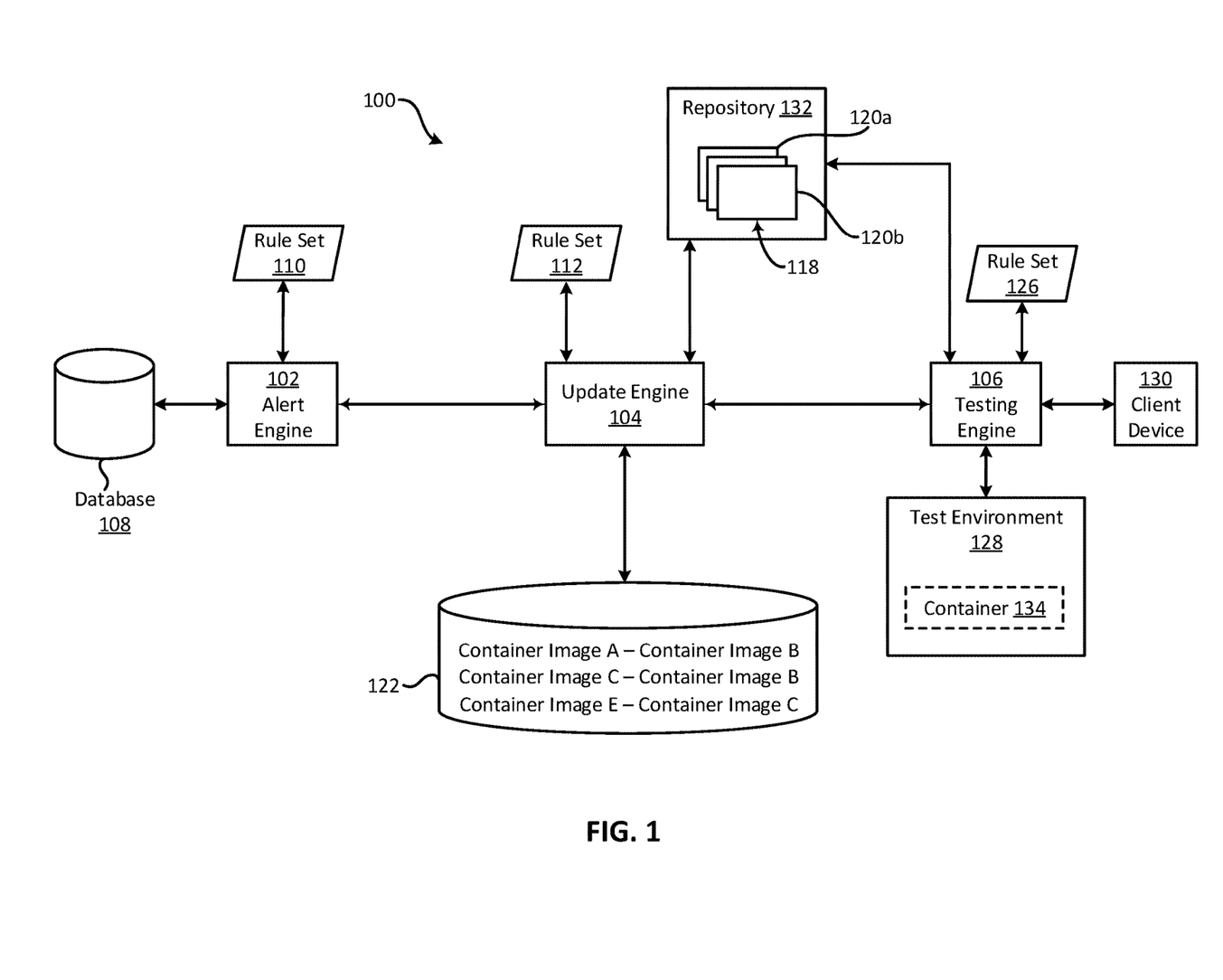
FIG. 1 is a block diagram of an example of a system for managing updates to container images according to some aspects.

FIG. 1 is a block diagram of an example of a system 100 for managing updates to container images 118 according to some aspects. In this example, the system 100 includes an alert engine 102, an update engine 104, and a testing engine 106. But other examples may include more or fewer components than are shown in FIG. 1.

The alert engine 102 can access a database 108 to detect an alert related to a piece of software. The alert can indicate a problem with the piece of software. The alert engine 102 communicate information about the alert to the update engine 104. The update engine 104 can receive the information about the alert and determine a container image 120a that includes the piece of software. The update engine 104 can then monitor a repository 132 for an updated version of the container image 120a in which the issue raised by the alert has been mitigated. If the update engine 104 detects the updated version of the container image 120a, the update engine 104 can update one or more other container images, such as container image 120*b*, that depend on container image 120*a*. In some examples, the update engine 104 can then communicate the updated version of container image 120*b* to the testing engine 106. The testing engine 106 can provision a test environment 128, perform one or more tests on the updated version of container image 120*b* to ensure that the updated version of container image 120*b* complies with one or more predefined criteria, and transmit the results of the tests to a client device 130 of a developer. In this manner, updating and testing of container images 118 can be performed automatically (e.g., with little or no human involvement).

Figure 2:
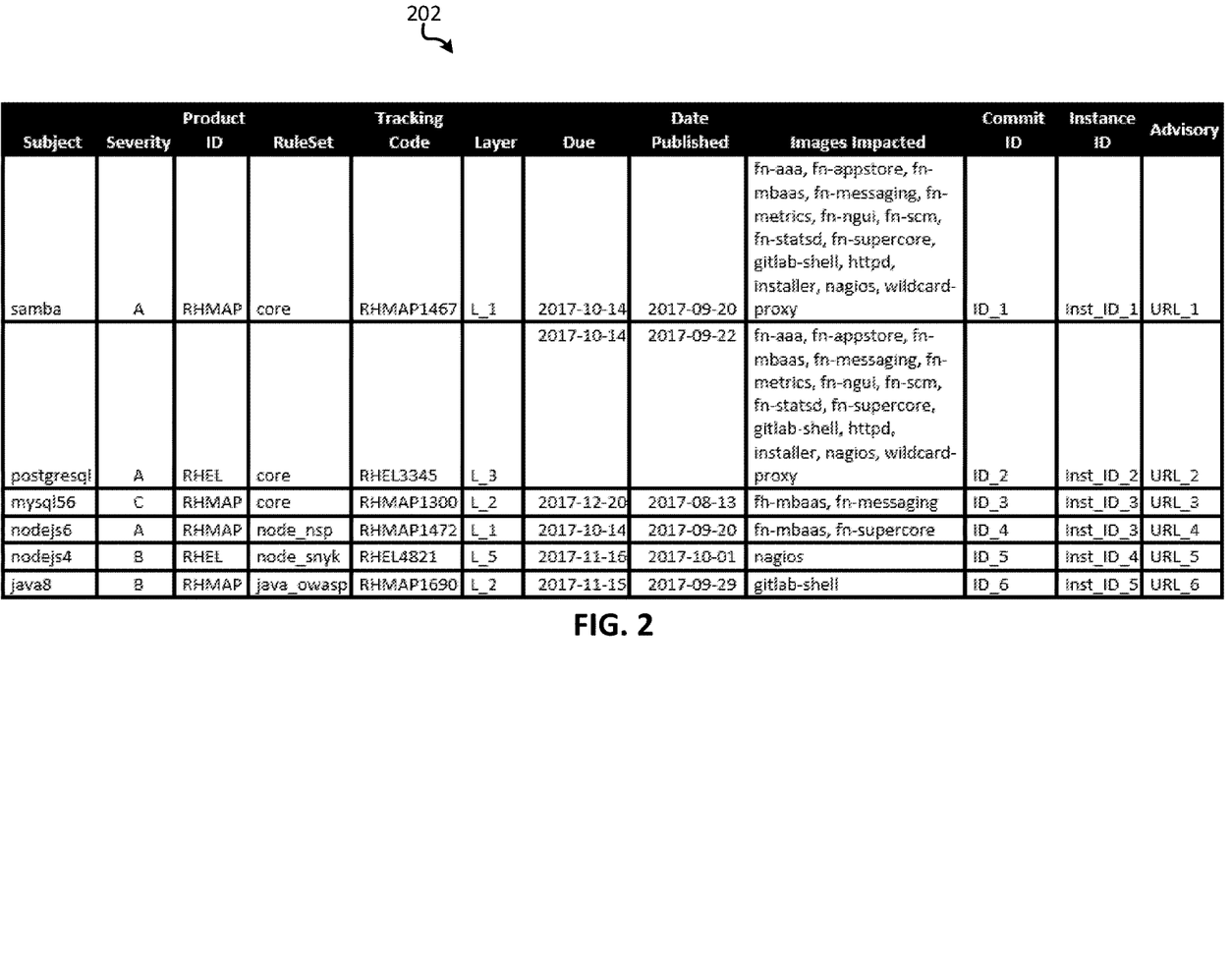
FIG. 2 is a table of an example of a database of alerts according to some aspects.

More specifically, the alert engine 102 can access the database 108, which may include alerts for various pieces of software. An example of the content 202 of database 108 is shown in FIG. 2. In this example, the content 202 includes alerts, where each alert is a row in the database 108. The alerts are related to the following pieces of software: samba, postgresql, mysql56, nodejs6, nodejs4, and java8. Each alert is graded with a severity level—A, B, or C. In some examples, level A may be the highest severity level and level C may be the lowest severity level. But other severity schemes are possible. In some examples, each alert also includes an identifier (ID) of a product that is impacted by the alert. For example, the alert for "samba" includes the product ID "RHMAP," which stands for Red Hat™ Mobile Application Platform, and which indicates that RHMAP is impacted by the alert. And the alert for postgresql includes the product ID "RHEL," which stands for Red Hat™ Enterprise Linux, and indicates that RHEL is impacted by the alert. In some examples, a specific rule-set can also be assigned to each piece of software. The rule set can designate when an update for the piece of software is to be triggered. For example, a "core" rule set is assigned to samba, postgresql, and mysql56. A different rule set, node_nsp, is assigned to nodejs6. Yet another rule set, node_snyk, is assigned to nodejs4. And so on. The different rule sets can enable different pieces of software to be updated based on customizable criteria that may be specific to the piece of software.

In some examples, each alert can also include a tracking code assigned to the alert. The tracking code can enable the alert to be tracked using various pieces of issue-tracking software, such as Jira™. In some examples, the alert may also indicate a layer of a container image in which the piece of software is included. Container images can be formed from multiple layers, with each layer include one or more pieces of software. In this example, samba is located in layer 1 of a corresponding container image, postgresql is located in layer 3 of a corresponding container image, mysql56 is located in layer 2 of a corresponding container image, and so on. In some examples, each alert can also include a due date by which an update to the piece of software must be made. For example, the alert for nodejs6 indicates that this piece of software must be updated by Oct. 14, 2017. This due date may be based on, for example, a contractual obligation with a customer, such as a Service Level Agreement (SLA) with a customer. In some examples, each alert may also include the date that the alert was published. For example, the alert for postgresql indicates that the alert was published (e.g., stored in the database 108 or otherwise made available) on Sep. 22, 2017.

In some examples, each alert can also include information about container images that are impacted by the alert. These can be container images that use the piece of software and may need to be updated if the piece of software is updated. For example, the alert for mysql56 indicates that the container images "fh-mbaas" and "fn-messaging" are impacted by the alert, which may mean that these container images include mysql56 and may need to be updated if mysql56 is updated. In some examples, each alert can also include a commit ID indicating a most recent version of the piece of software that was committed to a repository, such as repository 132 in FIG. 1 (e.g., a GIT repository). Each alert can also be assigned an instance ID indicating an instance on an Amazon™ web server or other cloud-computing provider corresponding to the alert. In some examples, each alert can include a link to an advisory notice about the alert. The advisory notice can be a website publication that details the specifics of the alert (e.g., to provide more information to the general public). The alert features discussed above are provided as examples for illustrative purposes, but the database 108 can include any number and combination of alerts having any number and combination of features, including more or fewer features shown in FIG. 2.

Returning to FIG. 1, the alert engine 102 can access the database 108 to identify one or more alerts related to pieces of software in containers. If the alert engine 102 detects an alert related to a piece of software, the alert engine 102 can use a rule set 110 related to the piece of software to determine if the piece of software is to be updated. For example, if the alert is related to the piece of software "samba," the alert engine 102 can use a "core" rule set (e.g., as designated in FIG. 2) to determine if the piece of software is to be updated. The rule set 110 can be in the form of program code, if-then statements, if-then else statements, a lookup table, or another format. The rule set 110 can specify one or more criteria (e.g., thresholds) that must be met to trigger an update of the piece of software. Examples of a criterion can include (i) the alert being of a certain severity level, such as severity level A; (ii) a product ID being for a particular product, such as RHEL; (iii) a layer of a container image that includes the piece of software being a particular layer, such as layer 1; (iv) the piece of software being a specific piece of software, such as postgresql; (v) the piece of software being programmed in a particular programming language, such as JavaScript, NodeJS, or C++; (vi) a date related to the alert being within a predefined timespan, such as the date being within two days; or (vii) any combination of these. Additionally or alternatively, the rule set 110 can include another rule set (a sub-rule set) that can at least partially define when the piece of software is to be updated.

As a particular example, the rule set 110 can specify that all alerts with severity level A are to be immediately flagged for updating as soon as they arrive, while alerts with other severity levels may be treated in a different manner. For example, alerts with a severity level of B may be less important. So, the rule set 110 may specify that the alert engine 102 is to wait for a predefined number (e.g., five) of alerts with severity level B to accumulate before flagging their corresponding software for updating. In some examples, the rule set 110 is customizable so that a user can set the criteria that triggers an update to a piece of software.

The alert engine 102 can communicate information about an alert in the database 108 to the update engine 104. The information can include, for example, any amount and combination of the information listed in FIG. 2, such as the container images impacted by the alert. For example, the alert engine 102 may determine that samba (in FIG. 2) is to be updated since it has severity level A and, as a result, indicate that samba is going to be updated to the update engine 104. The alert engine 102 may also indicate some or all of the container images impacted by this update (e.g., fn-aaa, fn-appstore, fn-ngui, etc.) to the update engine 104.

The update engine 104 can receive the information from the alert engine 102 and, in some examples, can monitor the repository 132 based on the information. For example, the update engine 104 can receive a list of some or all of the container images 118 impacted by a particular alert from the alert engine 102 and responsively monitor the repository 132 for updates to those container images 118. As a particular example, the alert engine 102 can indicate that container image 120a is impacted by the alert to the update engine 104, which can then monitor the repository 132 for updates to the container image 120a. If a fix (e.g., a patch) for the piece of software in the alert becomes available, then container image 120a may be rebuilt (e.g., by its developers) using the fix and an updated version of the container image 120a may be stored in the repository 132. This may make the updated version of the container image 120a accessible to customers or other users. The update engine 104 can detect the updated version of the container image 120a in the repository 132 and responsively perform one or more operations.

In some examples, the update engine 104 can determine dependencies between container images 118. The dependence of one container image on another container image can be referred to as a container dependency. The update engine 104 may determine container dependencies using a database 122 that includes relationships between container images 118. For illustrative purposes, the database 122 in FIG. 1 indicates that container image A depends on container image B; container image E depends on container image C; and container image C depends on container image B. But the database 122 can express any number and combination of container dependencies. In some examples, the update engine 104 can at least partially create the database 122 by analyzing container images 118 to identify dependencies there-between. For example, the update engine 104 can analyze the contents of container image E to determine that it depends on container image C. The update engine 104 can then analyze the contents of container image C to determine that it depends on container image B. In this manner, the update engine 104 can recursively analyze the contents of container images 118 to determine their dependencies.

The update engine 104 can use the dependencies between container images 118 to update (e.g., rebuild) some or all of the container images that depend on an updated version of a container image in the repository 132. For example, the update engine 104 can determine that an updated version of container image B has been stored in the repository 132. In response, the update engine 104 can determine that (i) container image C depends on container image B, and (ii) container image E depends on container image C, which in turn depends on container image B. Based on these determinations, the update engine 104 can update container image C and container image E using the updated version of container image B. The update engine 104 can cause any number and combination of container images 118 to be updated based on detecting that a dependency was updated. After updating a container image, the update engine 104 may store the updated container image in the repository 132.

In some examples, the update engine 104 can update one or more container images based on a rule set 112. The rule set 112 can be in the form of program code, if-then statements, if-then else statements, a lookup table, or another format. The rule set 112 may indicate how a particular container image is to be updated. For example, the rule set 112 may specify that container image A is to be updated by incorporating a certain layer (e.g., layer 5) from container image B into a certain layer (e.g., layer 2) of container image A. As another example, the rule set 112 may specify other dependencies, such as other containers images, applications, libraries, etc., that need to be used to update container image A. As yet another example, the rule set 112 may specify an order for updating a container image. For example, the rule set 112 may indicate that container image C is to be updated before container image E, since container image E depends on container image C. The rule set 112 can include any number and combination of parameters for controlling how and when a container image is updated. In some examples, the rule set 112 is customizable so that a user can select when and how a container image is to be updated.

The update engine 104 can communicate information related to an updated container image to the testing engine 106. For example, the update engine 104 can transmit an identifier of an updated container image to the testing engine. The identifier may be a name, filename, identification number, commit ID, or other identifier of the updated container image. The testing engine 106 can use the identifier to obtain the updated container image. For example, the update engine 104 can transmit a commit ID for an updated container image to the testing engine 106. The testing engine 106 can then access the repository 132 and obtain the updated container image using the commit ID. As another example, the update engine 104 can transmit a file name for an updated container image to the testing engine 106. The testing engine 106 can then access the repository 132 and obtain the updated container image using file name.

The testing engine 106 can run one or more tests on the updated container image in a test environment 128. For example, the testing engine 106 can provision the test environment 128, which may be an instance in a cloud-computing environment, such as an Amazon Web Services™ environment. The test environment 128 may run any operating system, such as Red Hat™ Linux. The test engine 106 then launch (e.g., deploy) the updated container image in the test environment 128, which can result in a container 134 that properties defined by the characteristics of the updated container image. The test engine 106 can then perform a variety of tests on the container 134. In some examples, the test engine 106 can communicate one or more test results to a client device 130 by e-mail, text-message, a mobile notification, or another notification method. Examples of the client device 130 may include a smartphone, tablet, e-reader, laptop computer, desktop computer, or smart watch. A developer may monitor the client device 130 and receive the test result(s). This may enable the developer to perform one or more actions based on the test result(s).

The testing engine 106 may provision the test environment 128, perform a test, or both based on rule set 126. The rule set 126 can be in the form of program code, if-then statements, if-then else statements, a lookup table, or another format. In some examples, the rule set 126 may indicate how the test environment 128 is to be provisioned. For example, the rule set 126 may specify if the test environment 128 is to be provisioned (i) on a specific type of server, such as an Amazon Web Services server; (ii) for a specific duration, such as one hour; (iii) with a specific operating system, such as Linux; (iv) with certain applications, libraries, or other software; (v) or any combination of these. The rule set 126 may additionally or alternatively specify which test or combination of tests are to be run. For example, the rule set 126 may designate five specific tests to be run. The rule set 126 may additionally or alternatively specify how and when certain tests are to be run. For example, the rule set 126 may specify an order in which tests are to be run, certain times of day for tests to be run, computer resource requirements (e.g., processing or memory requirements) for a certain test to be run, or any combination of these. In some examples, the rule set 126 is customizable so that a user can select when and how tests are to be run and the test environment 128 is to be provisioned.

Some or all of the above-described features can enable container images to be updated and tested automatically. For example, the system 100 can determine when a particular container image has been updated, update other container images that depend on the particular container image, and test the updated container images, all with little or no human intervention. This can greatly expedite the efficiency with which updates are made to container images.

Although the components of FIG. 1 are shown as separate components for clarity, in other examples some or all of the components in FIG. 1 may be combined. For example, the alert engine 102, update engine 104, and testing engine 106 can be combined into a single engine. As another example, databases 108 and 122 can be combined into a single database. Also, some or all of the components shown in FIG. 1 can be incorporated into a single computing device. For example, a single server may include the alert engine 102, the update engine 104, the testing engine 106, database 108, database 122, rule set 110, rule set 112, and rule set 126. The components shown in FIG. 1 may be combined, separated, or reconfigured in any suitable manner. For example, the database 108 can be separated into multiple databases. In some examples, an "engine" may include computer-readable program code that is executable by a processing device. Alternatively, an "engine" may be a processing device that is executing computer-readable program code.

Figure 3:
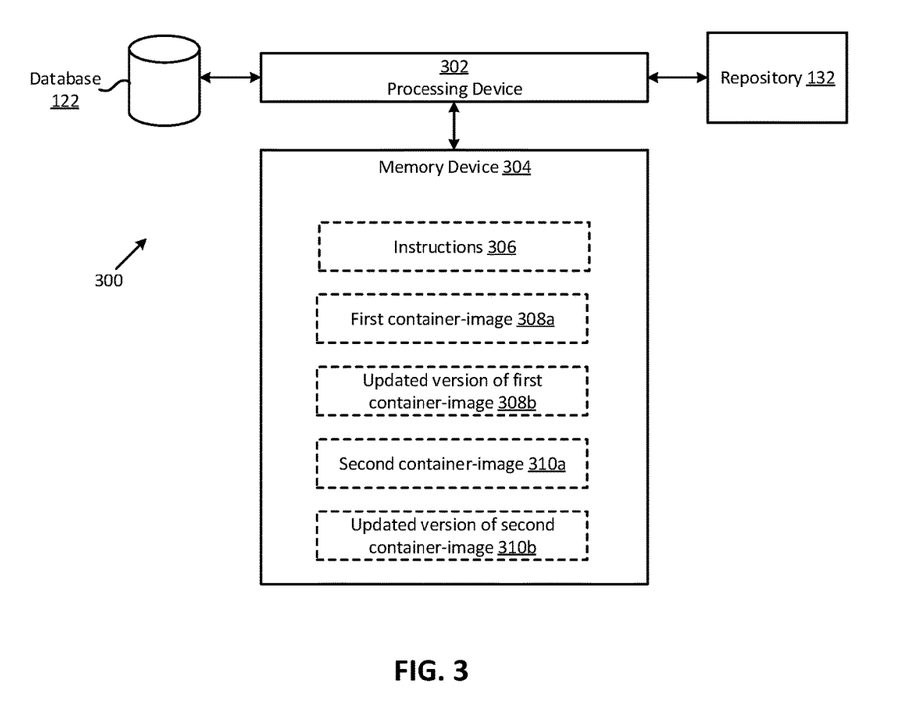
FIG. 3 is a block diagram of another example of a system for managing updates to container images according to some aspects.

FIG. 3 is a block diagram of another example of a system 300 for managing updates to containers according to some aspects. The system 300 includes a processing device 302 communicatively coupled to a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute one or more operations for managing updates to container images. The processing device 302 can execute instructions 306 stored in the memory device 304 to perform the operations. In some examples, the instructions 306 can include processor-specific instructions generated by a compiler or an interpreter from code written in any suitable computer-programming language, such as C, C++, C#, Java, etc.

Memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, cache memory, or any other type of non-volatile memory. In some examples, at least some of the memory devices 304 can include a medium from which the processing device 302 can read instructions 306. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

In some examples, the processing device 302 can detect when a first container-image 308*a* is updated (e.g., by monitoring a repository 132 or receiving a notification of the update). The processing device 302 can also determine that a second container-image 310*a* depends on the first container-image 308*a* (e.g., using database 122 or receiving a notification of the dependency). Based on detecting an updated version of the first container-image 308*b* in the repository and determining that the second container-image 310*a* depends on the first container-image 308*a*, the processing device 302 can rebuild a second container-image 310*a* using the updated version of the first container-image 308*b*. This can result in an updated version of the second container-image 310*b*. The processing device 302 may then cause the updated version of the second container-image 310*b* to be stored in the repository or elsewhere.

In some examples, the processing device 302, the memory device 304, and the database 122 can be incorporated into a single computing device. In other examples, some or all of these components may be included in separate computing devices. Any number and combination of the components shown in FIG. 3 can be distributed among any number and combination of computing devices.

Figure 4:
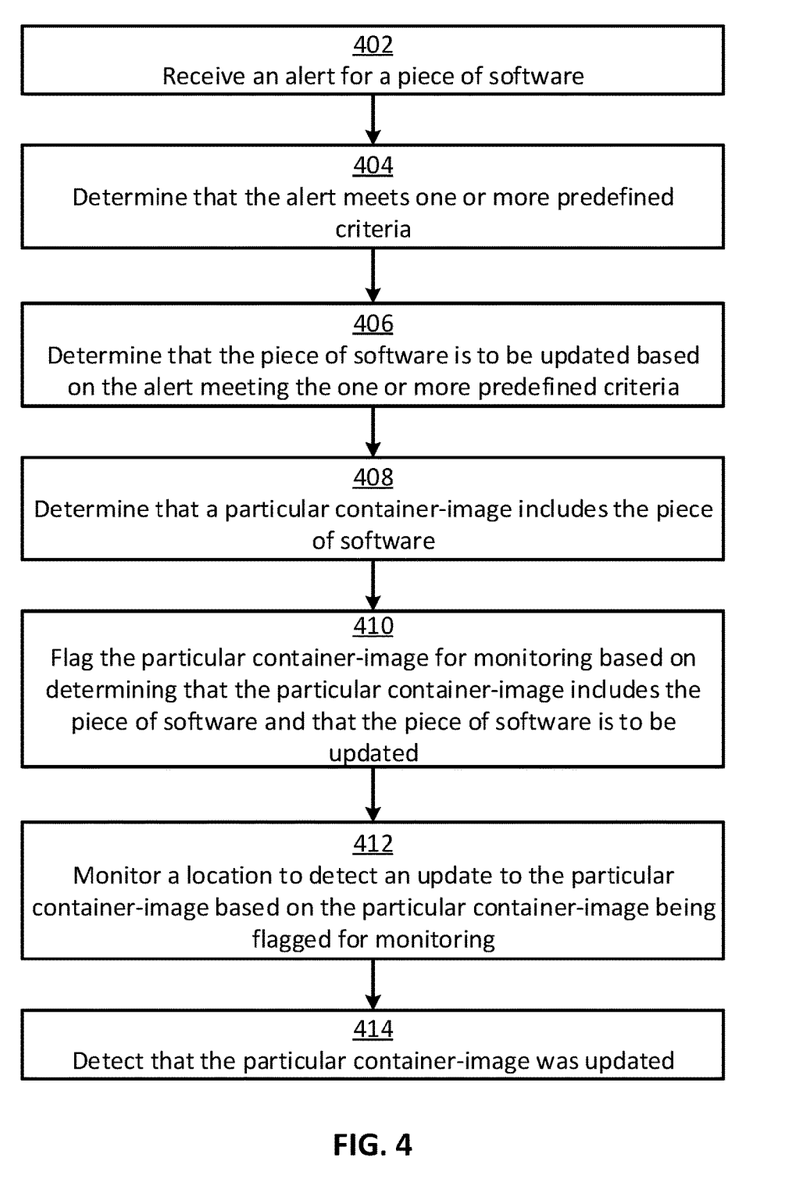
FIG. 4 is a flow chart of an example of a process for managing updates to container images according to some aspects.
Figure 5:
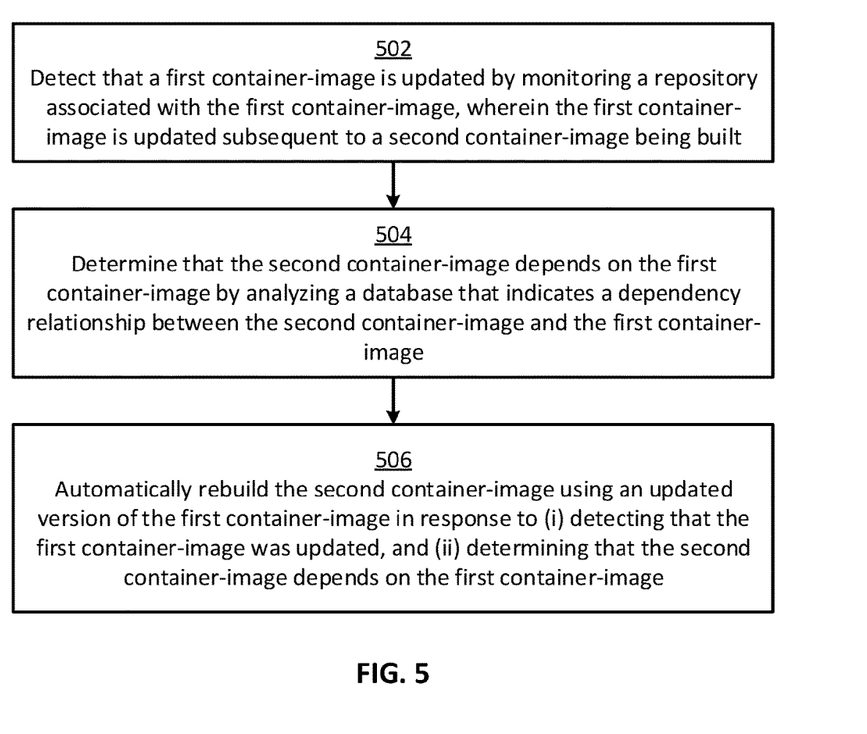
FIG. 5 is a flow chart of another example of a process for managing updates to container images according to some aspects.

In some examples, the system 300 can implement the one or both of the processes shown in FIGS. 4-5 to manage updates to container images. Other examples can include more steps, fewer steps, different steps, or a different combination of steps than shown in FIGS. 4-5. The steps below are described with reference to components discussed above.

In block 402, a processing device 302 receives an alert for a piece of software. The alert can indicate a bug, exploit, or other undesirable condition related to the piece of software. The processing device 302 can receive the alert by accessing a database, such as database 108 of FIG. 1. Alternatively, the processing device 302 can receive the alert as an electronic communication from another computing device. For example, the processing device 302 can receive the alert as an electronic communication from a remote computing device over a network, such as the Internet. The processing device 302 can receive any number and combination of alerts that can originate from any number and combination of sources, such as online blogs, websites, security researchers, data-gathering services, developers, etc.

In block 404, the processing device 302 determines that the alert meets one or more predefined criteria. For example, the processing device 302 can obtain a rule set, such as rule set 110, that expresses predefined criteria. The rule set can be customizable so that the predefined criteria can be set by a user. The processing device 302 can then compare information in the alert (or derived from the alert) to the predefined criteria to determine whether or not the alert meets the predefined criteria. If so, the processing device 302 can flag the alert as having met the predefined criteria. Otherwise, the processing device 302 may flag the alert as not having met the predefined criteria or take no other action with respect to the alert.

In block 406, the processing device 302 determines that the piece of software is to be updated based on the alert meeting the one or more predefined criteria. The processing device 302 may then, for example, flag the piece of software for updating.

In block 408, the processing device 302 determines that a particular container-image includes the piece of software. For example, the alert itself may indicate that the particular container-image includes the piece of software, as shown in the "images impacted" column of FIG. 2. In some examples, the processing device 302 can analyze some or all of the container images it is charged with maintaining to determine the software contents of the container images. The processing device 302 can then create a database indicating the software content(s) of each container image. The processing device 302 can use the database to then determine that one or more particular container-images include the piece of software.

In block 410, the processing device 302 can flag the particular container-image for monitoring based on determining (i) that the particular container-image includes the piece of software and (ii) that the piece of software is to be updated. These two conditions being met may indicate that a developer will likely update the piece of software, as well as the particular container-image that includes the piece of software, in the near future.

In block 412, the processing device 302 monitors a repository, such as repository 132 or memory device 304; an inbox, such as an e-mail inbox; a website; or another location to detect an update to the particular container-image. In some examples, this can involve periodically accessing the location to determine if there has been a change to the version of the particular container-image previously accessible at the location.

In block 414, the processing device 302 detects that the particular container-image was updated. For example, the processing device 302 can access the location and determine that a version number for the particular container-image has increased from a prior version number, indicating that the version of the particular container-image now available at the location is an updated version. As another example, the processing device 302 can access the location and determine that a commit ID for the particular container-image has changed from a prior commit ID, indicating that the version of the particular container-image now available at the location is a different (e.g. updated) version. Any number and combination of techniques can be used to enable the processing device 302 to detect when a container image is updated.

Referring now to FIG. 5, in block 502, a processing device 302 detects that a first container-image 308a is updated by monitoring a repository 132 associated with the first container-image 308a. The first container image 308a can be updated subsequent to a second container-image 310a being built. For example, the first container-image 308a may be built at a particular point in time, and then the second container-image 310b may be subsequently built using at least part of the first container image 308a. After the second container-image 310b is built, the first container-image 308a may be updated, and the processing device 302 can detect that the first container-image 308a was updated. In some examples, the processing device 302 can detect that the first container-image 308a was updated using any number and combination of the methods discussed above with respect to FIG. 4.

In block 504, the processing device 302 determines that the second container-image 310a depends on the first container-image 308a by analyzing a database 122 that indicates a dependency relationship between the second container-image 310a and the first container-image 308a in a database 122. For example, the processing device 302 can access the database 122 and determine that there is a correlation between the second container-image 310a and the first container-image 308a in a row of the database. This may signify that the second container-image 310a depends on the first container-image 308a.

In block 506, the processing device 302 automatically rebuilds the second container-image 310a using an updated version of the first container-image 308b to create an updated version of the second container-image 310b. The processing device 302 can automatically rebuild the second container-image 310a in response to (i) detecting that the first container-image 308a was updated, and (ii) determining that the second container-image 310a depends on the first container-image 308a. Automatically rebuilding the second container-image 310a can involve rebuilding the second container-image 310a with little or no human involvement, such as without a human triggering (e.g., directly triggering) the rebuild.

In some examples, rebuilding the second container-image 310a can involve using a container-management tool for creating, deploying, and running applications using containers, such as Docker™. One or more commands can be provided to the container-management tool that cause the container-management tool to build the updated version of the second container-image 310b based at least in part on the updated version of the first container-image 308b. In some examples, rebuilding the second container-image 310a can involve using customizable a rule set, such as rule set 112, indicating how the second container-image 310a is to be built.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
   receiving, by a processing device, an alert for a piece of software;
   in response to receiving the alert, determining, by the processing device, that a first container-image comprises the piece of software;
   in response to determining that the first container-image comprises the piece of software, monitoring, by the processing device, a repository configured to store one or more versions of the first container-image for an updated version of the first container-image;
   while monitoring the repository, detecting, by the processing device, the updated version of the first container-image, wherein the first container-image is updated subsequent to a second container-image being built;
   determining, by the processing device, that the second container-image depends on the first container-image by analyzing a database that indicates a dependency relationship between the second container-image and the first container-image; and
   in response to (i) detecting the updated version of the first container-image and (ii) determining that the second container-image depends on the first container-image, automatically rebuilding, by the processing device, the second container-image using the updated version of the first container-image to create an updated version of the second container-image.

2. The method of claim 1, further comprising, prior to monitoring the repository for the updated version of the first container-image:

receiving the alert for the piece of software by accessing a database of alerts;

in response to receiving the alert, determining that the alert meets one or more predefined criteria in a customizable rule set by analyzing the alert;

based on determining that the alert meets the one or more predefined criteria, determining that the piece of software is to be updated; and based on determining that (i) the piece of software is to be updated and (ii) the first container-image includes the piece of software, flagging the first container-image for monitoring.

3. The method of claim 2, wherein the one or more predefined criteria comprises at least one of (i) the piece of software being a predefined piece of software; (ii) a product related to the piece of software being a predefined product; (iii) a severity level of the alert being a predefined severity-level; (iv) a date related to the alert being a predefined date; or (v) a programming language related to the piece of software being a predefined programming language.

4. The method of claim 2, further comprising:

based on flagging the first container-image for monitoring, monitoring the repository to detect when the first container-image is updated; and detecting that the first container-image was updated based on the updated version of the first container-image being stored in the repository.

5. The method of claim 1, further comprising determining that the second container-image depends on the first container-image by:

analyzing a plurality of container images to determine one or more container dependencies for each respective container-image of the plurality of container images;

storing a respective relationship between each respective container-image and the one or more container dependencies in the database; and determining that there is a correspondence between the second container-image and the first container-image in the database.

6. The method of claim 1, further comprising:

determining that multiple container images depend on the first container-image using the database; and rebuilding the multiple container images in response to (i) detecting that the first container-image was updated and (ii) determining that the multiple container images depend on the first container-image.

7. The method of claim 1, further comprising:

in response to detecting that the updated version of the second container-image is created, provisioning a test environment that has one or more characteristics defined by a customizable rule-set;

running one or more tests in the test environment on the updated version of the second container-image to ensure that the updated version of the second container-image complies with one or more predefined requirements, the one or more tests being defined by the customizable rule-set;

determining that the updated version of the second container-image passed the one or more tests; and based on determining that the updated version of the second container-image passed the one or more tests, shutting down the test environment.

8. A system comprising:
a processing device; and
a memory device that includes instructions executable by the processing device for causing the processing device to:

receive an alert for a piece of software;

in response to receiving the alert, determine that a first container-image comprises the piece of software;

in response to determining that the first container-image comprises the piece of software, monitor a repository configured to store one or more versions of the first container-image for an updated version of the first container-image;

while monitoring the repository, detect the updated version of the first container-image, wherein the first container-image is updated subsequent to a second container-image being built;

determine that the second container-image depends on the first container-image by analyzing a database that indicates a dependency relationship between the second container-image and the first container-image; and in response to (i) detecting the updated version of the first container-image and (ii) determining that the second container-image depends on the first container-image, automatically rebuild the second container-image using the updated version of the first container-image to create an updated version of the second container-image.

9. The system of claim 8, wherein the memory device further includes instructions that are executable by the processing device for causing the processing device to, prior to monitoring the repository for the updated version of the first container-image:

receive the alert for the piece of software by accessing a database of alerts;

in response to receiving the alert, determine that the alert meets one or more predefined criteria in a customizable rule set by analyzing the alert;

based on determining that the alert meets the one or more predefined criteria, determine that the piece of software is to be updated; and based on determining that (i) the piece of software is to be updated and (ii) the first container-image includes the piece of software, flag the first container-image for monitoring.

10. The system of claim 9, wherein the one or more predefined criteria comprises at least one of (i) the piece of software being a predefined piece of software; (ii) a product related to the piece of software being a predefined product; (iii) a severity level of the alert being a predefined severity-level; (iv) a date related to the alert being a predefined date; or (v) a programming language related to the piece of software being a predefined programming language.

11. The system of claim 9, wherein the memory device further includes instructions that are executable by the processing device for causing the processing device to:

based on flagging the first container-image for monitoring, monitor the repository to detect when the first container-image is updated; and detect that the first container-image was updated based on the updated version of the first container-image being stored in the repository.

12. The system of claim 8, wherein the memory device further includes instructions that are executable by the processing device for causing the processing device to determine that the second container-image depends on the first container-image by:

analyzing a plurality of container images to determine one or more container dependencies for each respective container-image of the plurality of container images;

storing a respective relationship between each respective container-image and the one or more container dependencies in the database; and     determining that there is a correspondence between the second container-image and the first container-image in the database.

13. The system of claim 8, wherein the memory device further includes instructions that are executable by the processing device for causing the processing device to:

determine that multiple container images depend on the first container-image using the database; and     rebuild the multiple container images in response to (i) detecting that the first container-image was updated and (ii) determining that the multiple container images depend on the first container-image.

14. The system of claim 8, wherein the memory device further includes instructions that are executable by the processing device for causing the processing device to:

in response to detecting that the updated version of the second container-image is created, provision a test environment that has one or more characteristics defined by a customizable rule-set;

run one or more tests in the test environment on the updated version of the second container-image to ensure that the updated version of the second container-image complies with one or more predefined requirements, the one or more tests being defined by the customizable rule-set;

determine that the updated version of the second container-image passed the one or more tests; and     based on determining that the updated version of the second container-image passed the one or more tests, shut down the test environment.

15. A non-transitory computer-readable medium comprising instructions executable by a processing device for causing the processing device to:

receive an alert for a piece of software;

in response to receiving the alert, determine that a first container-image comprises the piece of software;

in response to determining that the first container-image comprises the piece of software, monitor a repository configured to store one or more versions of the first container-image for an updated version of the first container-image;

while monitoring the repository, detect the updated version of the first container-image, wherein the first container-image is updated subsequent to a second container-image being built;

determine that the second container-image depends on the first container-image by analyzing a database that indicates a dependency relationship between the second container-image and the first container-image; and     in response to (i) detecting the updated version of the first container-image and (ii) determining that the second container-image depends on the first container-image, automatically rebuild the second container-image using the updated version of the first container-image to create an updated version of the second container-image.

16. The non-transitory computer-readable medium of claim 15, further comprising instructions that are executable by the processing device for causing the processing device to, prior to monitoring the repository for the updated version of the first container-image:

receive the alert for the piece of software by accessing a database of alerts;

in response to receiving the alert, determine that the alert meets one or more predefined criteria in a customizable rule set by analyzing the alert;

based on determining that the alert meets the one or more predefined criteria, determine that the piece of software is to be updated;

and based on determining that (i) the piece of software is to be updated and (ii) the first container-image includes the piece of software, flag the first container-image for monitoring.

17. The non-transitory computer-readable medium of claim 16, wherein the one or more predefined criteria comprises at least one of (i) the piece of software being a predefined piece of software; (ii) a product related to the piece of software being a predefined product; (iii) a severity level of the alert being a predefined severity-level; (iv) a date related to the alert being a predefined date; or (v) a programming language related to the piece of software being a predefined programming language.

18. The non-transitory computer-readable medium of claim 16, further comprising instructions that are executable by the processing device for causing the processing device to:

based on flagging the first container-image for monitoring, monitor the repository to detect when the first container-image is updated; and     detect that the first container-image was updated based on the updated version of the first container-image being stored in the repository.

19. The non-transitory computer-readable medium of claim 15, further comprising instructions that are executable by the processing device for causing the processing device to determine that the second container-image depends on the first container-image by:

analyzing a plurality of container images to determine one or more container dependencies for each respective container-image of the plurality of container images;

storing a respective relationship between each respective container-image and the one or more container dependencies in the database; and     determining that there is a correspondence between the second container-image and the first container-image in the database.

20. The non-transitory computer-readable medium of claim 15, further comprising instructions that are executable by the processing device for causing the processing device to:

determine that multiple container images depend on the first container-image using the database; and     rebuild the multiple container images in response to (i) detecting that the first container-image was updated and (ii) determining that the multiple container images depend on the first container-image.

\* \* \* \* \*